US006910174B2

(12) United States Patent
Keeler

(10) Patent No.: US 6,910,174 B2
(45) Date of Patent: Jun. 21, 2005

(54) ERROR CORRECTION CODE BLOCK FORMAT

(75) Inventor: Stanton M. Keeler, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 307 days.

(21) Appl. No.: 09/872,060

(22) Filed: Jun. 1, 2001

(65) Prior Publication Data

US 2003/0028847 A1 Feb. 6, 2003

(51) Int. Cl.[7] .......................... H03M 13/00; G11C 29/00
(52) U.S. Cl. ..................................... 714/769; 714/755
(58) Field of Search ................................ 714/769, 763, 714/755, 756

(56) References Cited

U.S. PATENT DOCUMENTS

| | | | | |
|---|---|---|---|---|
| 5,202,880 A | * | 4/1993 | Lee et al. ................. | 369/275.4 |
| 5,276,674 A | | 1/1994 | Tanaka ..................... | 369/275.3 |
| 5,283,159 A | * | 2/1994 | Norton et al. ........... | 430/270.15 |
| 5,392,262 A | * | 2/1995 | Finkelstein et al. ...... | 369/13.39 |
| 5,416,757 A | * | 5/1995 | Luecke et al. ........... | 369/44.23 |
| 5,917,792 A | * | 6/1999 | Shigenobu et al. ...... | 369/59.26 |
| 5,963,705 A | | 10/1999 | Kim et al. ................. | 386/126 |
| 5,974,580 A | * | 10/1999 | Zook et al. ............... | 714/755 |
| 5,978,958 A | * | 11/1999 | Tanaka et al. ............ | 714/804 |
| 5,991,911 A | * | 11/1999 | Zook ......................... | 714/758 |
| 6,158,038 A | * | 12/2000 | Yamawaki et al. ......... | 714/755 |
| 6,167,548 A | | 12/2000 | Yamakura ................... | 714/763 |
| 6,182,263 B1 | * | 1/2001 | Kojima et al. ............. | 714/769 |
| 6,216,245 B1 | | 4/2001 | Noda ......................... | 714/755 |
| 6,223,322 B1 | | 4/2001 | Michigami et al. ......... | 714/769 |
| 6,268,073 B1 | * | 7/2001 | Chen ........................ | 428/694 ML |
| 6,321,351 B1 | * | 11/2001 | Brown et al. ............... | 714/704 |
| 6,332,206 B1 | * | 12/2001 | Nakatsuji et al. ........... | 714/755 |
| 6,357,030 B1 | * | 3/2002 | Demura et al. ............. | 714/755 |
| 6,378,103 B1 | * | 4/2002 | Han ........................... | 714/769 |

FOREIGN PATENT DOCUMENTS

| | | | | |
|---|---|---|---|---|
| EP | 0807930 | 11/1997 | | |
| JP | 58137149 A | * 8/1983 | ............ | G11B/7/24 |
| JP | 04209340 A | * 7/1992 | ............ | G11B/7/24 |
| WO | WO 0193262 | 12/2001 | | |

OTHER PUBLICATIONS

"80 mm (1,23 Gbytes per side) and 120 mm (3,95 Gbytes per side) DVD–Recordable Disk (DVD–R)", *Standard ECMA–279* (1998), pp. 1–111.

* cited by examiner

*Primary Examiner*—Joseph D. Torres
(74) *Attorney, Agent, or Firm*—MacPherson Kwok Chen & Heid LLP; Jon W. Hallman

(57) ABSTRACT

An error correction code (ECC) block for a data storage disk, includes an array of data that is 88 rows by 172 columns. Each row includes ten bytes of inner parity code and each column includes sixteen bytes of outer parity making the array 104 rows by 182 columns. The ECC block is divided into eight sectors, each sector having eleven rows of data and two associated rows of outer parity, for a total of thirteen rows per sector. The ECC block in accordance with the present invention is half the size of a conventional ECC block but has a higher ratio of parity bytes to data. Consequently, the ECC block of the present invention is particularly advantageous with small form factor disks and first-surface media, i.e., disks with the recording layer on the exterior of the disk or under a very thin transparent layer.

5 Claims, 6 Drawing Sheets

| | 4 | 2 | 2 | | 10 |
|---|---|---|---|---|---|
| 0 | ID (1st) | IED | SI | User Data (164 bytes) (1st sector in ECC block) | Inner Parity |
| 1 | | | | User Data (172 bytes) (1st sector in ECC block) | Inner Parity |
| 2-9 | | | | ⋮ | |
| 10 | | | | User Data (168 bytes) (1st sector in ECC block) | EDC (4 bytes) | Inner Parity |
| 11 | ID (2nd) | IED | SI | User Data (164 bytes) (2nd sector in ECC block) | Inner Parity |
| 12 | | | | User Data (172 bytes) (2nd sector in ECC block) | Inner Parity |
| 13-20 | | | | ⋮ | |
| 21 | | | | User Data (168 bytes) (2nd sector in ECC block) | EDC (4 bytes) | Inner Parity |
| 22-86 | | | | ⋮ | |
| 87 | | | | User Data (168 bytes) (8th sector in ECC block) | EDC (4 bytes) | Inner Parity |
| 88 | | | | Outer Parity (172 bytes) (from 1st sector in ECC block) | Inner Parity |
| 89 | | | | Outer Parity (172 bytes) (from 1st sector in ECC block) | Inner Parity |
| 90-101 | | | | ⋮ | |
| 102 | | | | Outer Parity (172 bytes) (from 8th sector in ECC block) | Inner Parity |
| 103 | | | | Outer Parity (172 bytes) (from 8th sector in ECC block) | Inner Parity |

FIG. 3

|       | 4   | 2   | 2  |                    200 |
|-------|-----|-----|----|------------------------|
| Row 0 | ID  | IED | SI | Data (164)             |

| Data (172 bytes) |
| Data (172 bytes) |

| Row 10 | Data (168 bytes) | EDC |
|        |                  | 4   |

Recording Frame 0

| | | | | | |
|---|---|---|---|---|---|
| $B_{0,0}$ | - - - - - | $B_{0,171}$ | $B_{0,172}$ | - - - - - | $B_{0,181}$ |
| | | | | | |
| $B_{10,0}$ | - - - - - | $B_{10,171}$ | $B_{10,172}$ | - - - - - | $B_{10,181}$ |
| $B_{88,0}$ | - - - - - | $B_{88,171}$ | $B_{88,172}$ | - - - - - | $B_{88,181}$ |
| $B_{89,0}$ | - - - - - | $B_{89,171}$ | $B_{89,172}$ | - - - - - | $B_{89,181}$ |

Recording Frame 0

Recording Frame 1

| | | | | | |
|---|---|---|---|---|---|
| $B_{11,0}$ | - - - - - | $B_{11,171}$ | $B_{11,172}$ | - - - - - | $B_{11,181}$ |
| | | | | | |
| $B_{21,0}$ | - - - - - | $B_{21,171}$ | $B_{21,172}$ | - - - - - | $B_{21,181}$ |
| $B_{90,0}$ | - - - - - | $B_{90,171}$ | $B_{90,172}$ | - - - - - | $B_{90,181}$ |
| $B_{91,0}$ | - - - - - | $B_{91,171}$ | $B_{91,172}$ | - - - - - | $B_{91,181}$ |

Recording Frame 1

Recording Frame 7

| | | | | | |
|---|---|---|---|---|---|
| $B_{77,0}$ | - - - - - | $B_{77,171}$ | $B_{77,172}$ | - - - - - | $B_{77,181}$ |
| | | | | | |
| $B_{87,0}$ | - - - - - | $B_{87,171}$ | $B_{87,172}$ | - - - - - | $B_{87,181}$ |
| $B_{102,0}$ | - - - - - | $B_{102,171}$ | $B_{102,172}$ | - - - - - | $B_{102,181}$ |
| $B_{103,0}$ | - - - - - | $B_{103,171}$ | $B_{103,172}$ | - - - - - | $B_{103,181}$ |

Recording Frame 7

FIG. 7

ERROR CORRECTION CODE BLOCK FORMAT

BACKGROUND OF THE INVENTION

1. Field of the Invention

The present invention relates to an optical recording medium and, more particularly, to an arrangement of data stored on optical media that provides increased data reliability.

2. Discussion of the Related Art

Optical disks, which in general are disks that accept and retain information in the form of marks in a recording layer that can be read by an optical beam, are in wide use for high-density recording of digital information. Optical disks, for example, are used as compact disks (CDs), memory for computers, i.e., CD-ROMs, and DVDs. Conventionally, optical disks have a form factor that is greater than 50 mm and, in fact, the inside data track of conventional optical disks is larger than 50 mm.

Because dust or debris on the surface of the optical disk can obscure the data located on the recording layer beneath the dust or debris, data stored on an optical disk is stored with redundancy information that is used to assist in reading the data correctly in the presence of errors in the readback signal. The data bytes and the redundancy bytes that are associated with the data are organized as units known as codewords. Conventionally, codewords are organized into a two dimensional array, known as product codes. All the bytes of the array are assigned to two different codewords, a vertical (column) codeword and a horizontal (row) codeword. The codewords are generated using Reed-Solomon Error Correction Codes (RS ECC codes). In DVD data format, the data is conventionally arranged as a two dimensional array of 192 rows by 172 columns. With the addition of the redundancy bytes, the array becomes 208 rows by 182 columns. The row codeword is described as RS(182,172,11) denoting that there are 10 byes of redundancy per row. The column codeword is described as RS(208,192,17) denoting that there are 16 bytes of redundancy per column. For more information regarding ECC in general, see ECMA Standard-279, pp.25–30, December 1998, which is incorporated herein by reference.

The bytes of each column codeword are typically interleaved, i.e., arranged at intervals on the optical disk. Interleaving disperses data and the redundancy information over a large area. Consequently, the ability to correct continuous large errors, i.e., burst errors, is increased.

Conventional ECC blocks provide adequate data reliability with conventional optical disks, e.g., disk having a form factor greater than 50 mm. However, with a small form factor optical disk, a conventional ECC block does not provide adequate data reliability for small form factor optical disks.

SUMMARY

An error correction code (ECC) block for a data storage disk, in accordance with the present invention is half the size of a conventional ECC block but has a higher ratio of parity bytes to data than is found in a conventional ECC block. Consequently, the ECC block of the present invention is particularly advantageous with small form factor disks and first-surface media, i.e., disks with the recording layer on the exterior of the disk or under a thin transparent layer, which is more susceptible to errors caused by dust or debris on the surface of the disk.

In accordance with one aspect of the present invention, a data storage disk has an error correction code (ECC) block stored on the disk. The ECC block includes an array of 104 rows and 182 columns of bytes, each row including ten bytes of inner parity and each column including sixteen bytes of outer parity. The ECC block includes row codewords described as RS(182,172,11) and column codewords described as RS(104,88,17). The ECC block is divided into eight sectors, each sector having eleven rows of data and two associated rows of outer parity, for a total of thirteen rows per sector. Each sector in the ECC block includes a four byte identification data (ID) field, a two byte ID error detection code field, a two byte system information field, a 1880 byte user data field, and a four byte error detection code field. The data storage disk may be a first-surface media that has the recording layer on the exterior of the data storage disk or under a thin transparent layer.

In another aspect of the present invention, an error correction coding method includes forming eight consecutive data frames, each data frame is arranged in an array of eleven rows of bytes to form 88 rows by 172 columns. Sixteen bytes of outer parity code are generated to be associated with each of the 172 columns. The sixteen bytes are added to each of the 172 columns to form sixteen rows of outer parity code, wherein two rows of the outer parity code are associated with each of the eight consecutive data frames, such that the eight consecutive data frames comprises 104 rows by 172 columns. Each of the two rows of the outer parity code associated with a data frame is appended to the end of the data frame. Ten bytes of inner parity code are generated to be associated with each of the 104 rows. The ten bytes are added to each of said 104 rows, such that the eight consecutive data frames comprises 104 rows by 182 columns. Forming eight consecutive data frames includes generating an identification data (ID) for each data frame; generating an ID error detection code for each ID; generating an error detection code for each data frame; and arranging each of the eight consecutive data frames to include the ID, the ID error detection code, user data, and the error detection code.

In another aspect of the present invention, a data storage disk has an ECC block that includes an array divided into eight sectors, each sector having thirteen rows and a plurality of columns, wherein two of the thirteen rows of each sector are outer parity bytes. Each sector can have 182 columns, where ten columns are inner parity bytes. Each sector includes an identification data (ID) field; an ID error detection code field; a user data field; and an error detection code field.

BRIEF DESCRIPTION OF THE DRAWINGS

FIG. 3 is an error correction code (ECC) block in accordance with an embodiment of the present invention.

FIG. 7 shows data block recording frames with the outer parity code rows interleaved two at a time with the every eleven rows in the ECC block.

DETAILED DESCRIPTION

Figure 1:
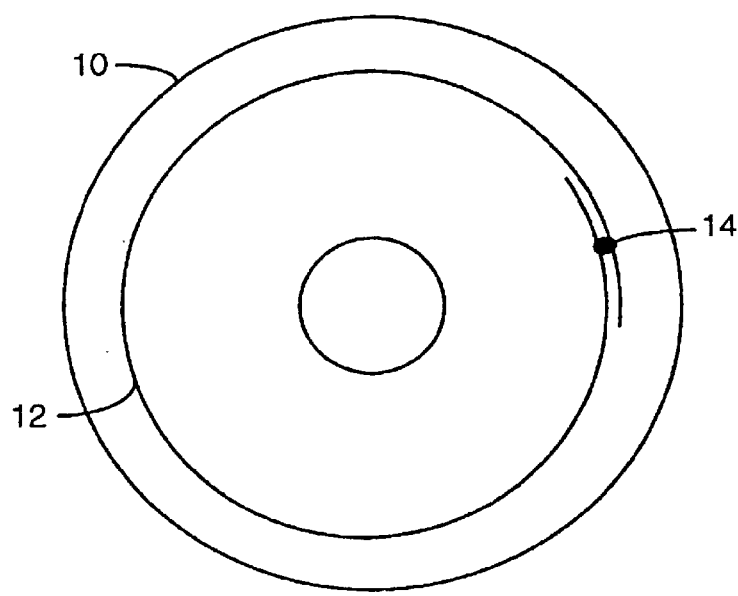
FIG. 1 shows a top view of a small form factor disk with a track on which is recorded a conventional ECC block.

A number of disk-shaped optical storage media have been developed for use in storing various types of digital data. Common current (typically read-only) examples include the compact disk (CD) and digital versatile disk (DVD). Although these examples have been highly successful for particular applications, such as storing data for use on a personal computer (PC), or storing music or other audio or video information, such as motion pictures, these devices have proved less useful in situations where, for practical, historical or other reasons, an optical storage medium with a smaller size is preferable. One class of such application includes various personal electronic devices (PEDs). Personal electronic devices in general have a size, shape and weight such that it is feasible and convenient to carry or wear such devices on the person. Typically, to be practical, such devices need to be substantially pocket-sized. Accordingly, it would be advantageous to provide an appropriately sized disk-shaped storage medium to be used in a pocket-sized PED. An appropriately sized disk is for example not significantly larger than approximately 50 mm, and may have, e.g., an outside diameter of approximately 32 mm and an inside data track diameter of approximately 11 mm. In contrast, the standard CD or DVD disk is about 120 mm in diameter (with an inside data track greater than 45 mm), which is believed too large to be accommodated in a pocket-sized PED or to be, itself, considered pocket-sized.

To produce a pocket-sized PED, not only does the storage medium need to be small, but the other components of the pocket-sized PED need to be small. For example, it is advantageous to reduce the size of the optical pick up unit and the optical path. For more information related to the miniaturization of the optical head and optical path, see, U.S. patent application, entitled, "Low Profile Optical Head", by Ian Redmond et al., U.S. Ser. No. 09/457,104, filed Dec. 7, 1999, and U.S. patent application, entitled, "Beamshaper For Optical Head", by Ian Redmond et al., U.S. Ser. No. 09/764,026, filed Jan. 16, 2001, which have the same assignee as the present disclosure and are incorporated herein by reference.

Conventional optical disks use an interior recording layer, which is referred to as a second-surface media, i.e., a media in which the read/write beam traverses a relatively thick optically transparent substrate before reaching the (possibly composite) recording layer. In a second-surface medium, the transparent substrate is sufficiently thick, e.g., about 0.6 to 1.2 mm, that read/write operations are relatively insensitive to dust particles, scratches, and the like, which are located more than 50 wavelengths from the recording layer (such that, considering the cone angle, there is little effect on shape or power of the light spot, by the time it reaches the recording layer).

The use of second-surface media, however, limits the miniaturization of the optical path. To assist in the miniaturization of the optical path, a first-surface media is used. A first surface media has the recording layer on the exterior of the disk, or the recording layer may be covered by a sufficiently thin, e.g., 2.5 µm, transparent layer that there is no need to consider aberrations, such as spherical aberrations, coma, astigmatism,and birefringence (which are common with thick transparent layers) when designing the read/write beam path. In this sense, the recording layer is effectively the "first surface" reached by the read/write beam. The use of first-surface media permits a reduction in the optical path length and a miniaturization of the optical head. Small form factor disks and first-surface media are described in more detail in the U.S. patent application entitled "Removable Optical Storage Device and System", by Michael F. Braitberg, et al., filed May 20, 1999, Ser. No. 09/315,398, which has the same assignee as the present disclosure and which is incorporated herein by reference.

While a small form factor disk with a first-surface media provides the size and miniaturization capabilities desired for a pocket-sized PED, the small size of the disk and first-surface properties produce difficulties with error correction that are not found in conventional disks. For example, the track length of a small form factor disk is small relative to a conventional disk. Consequently, while a conventional ECC block does not extend around a conventional disk (even at the inner diameter track), the same ECC block may extend around a small form factor disk, which can result in a single defect appearing in the same ECC block multiple times. FIG. 1 shows a top view of a small form factor disk 10 with a track on which is recorded a conventional ECC block 12. As can be seen in FIG. 1, the small form factor disk 10 is sufficiently small that conventional ECC block 12 extends around the disk 10. Because ECC block 12 extends around the disk 10, if dust particle 14 is present in one part ECC block 12 causing a burst error, the same dust particle 14 may be present in another portion of ECC block. Consequently, multiple burst errors within the ECC block 12 are created by the same defect, thereby reducing the ability to correct for the defect. Multiple burst errors within the same ECC block caused by the same defect does not occur on a conventional sized disk, however, because a conventional ECC block does not extend around a conventionally sized disk, even at the inner most diameter of the disk.

Figure 2A:
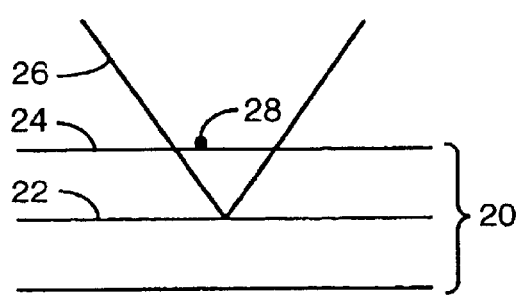
FIG. 2A illustrates a second-surface media with a recording layer over which is a thick transparent layer as used with conventional disks.
Figure 2B:
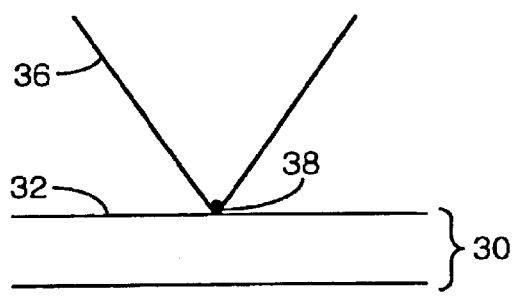
FIG. 2B shows a first surface media, with a recording layer but no overlying layer.

FIG. 2A illustrates a second-surface media 20 having a recording layer 22 and a thick transparent substrate 24 as used with conventional disks. A read/write beam 26 is shown as incident on and focused on the recording layer 22. The relatively thick transparent substrate 24 means that dust particle 28, or scratches, debris and the like are spaced sufficiently far from the recording layer 22 that it is substantially defocused and occupy only a small portion of the incoming read/write beam 26. In comparison, FIG. 2B shows a first surface media 30 having a recording layer 32 on the exterior of the disk, i.e., no overlying substrate. The read/write beam 36 is shown as incident on and focused on the recording layer without traveling through the substrate. However, because there is no overlying transparent substrate, a dust particle 38, which would not be a problem for second-surface media (as illustrated in FIG. 2A) is in focus with a first-surface media and will block a substantial portion of the read/write beam 36. Consequently, while the first-surface media advantageously permits the reduction of the optical path, the first-surface media is more sensitive to small sized dust or debris on the surface, which will obscure the underlying data creating errors in the data stream when read back. As described above, first-surface material 30 may include a thin transparent layer, e.g., 2.5 µm (not shown in FIG. 2B), but the same problem occurs.

Consequently, a non-conventional small form factor disk that uses first-surface media suffers from increased burst errors and greater sensitivity to defects compared to a conventional disk. Thus, an improved error correction code (ECC) block is needed that will eliminate the occurrence of multiple burst errors in the same ECC block from a single defect and will provide increased correction power so as to provide better data reliability when the data is read back in the presence of large amounts of defects, such as relatively small dust and debris on the surface of the media.

FIG. 3 is an error correction code (ECC) block 100 that provides better data reliability than conventional ECC blocks and reduces or eliminates multiple burst errors caused by the same defect in accordance with an embodiment of the present invention. ECC block 100 is smaller than conventional ECC blocks, such as that described in ECMA standard 279, but has increased correction capability. Thus, ECC block 100 may be used with small form factor disks, e.g., smaller than 50 mm, and/or disks that use first-surface media, such as that disclosed in Ser. No. 09/315,398, which is incorporated herein by reference.

As shown in FIG. 3, ECC block 100 is a two-dimensional array of codewords of 104 rows by 182 columns. Each row has 172 bytes of data and an associated 10 bytes of redundancy (shown as "Inner Parity" bytes in FIG. 3), and each column has 88 bytes of data and an associated 16 bytes of redundancy (shown as "Outer Parity" bytes in FIG. 3). Thus, the row codeword is RS(182,172,11) and the column codeword is RS(104,88,17).

The ECC block 100 is divided into 8 sectors. The first row, e.g., row 0, of each sector includes a 4 byte field for Identification Data (ID), a 2 byte field for an ID Error Detection Code (IED), a 2 byte field for System Information (SI), and 164 bytes of data. The ID, IED, and SI are described in more detail in ECMA Standard 279, pages 26–27, which is incorporated herein by reference, where SI is similar to the Copyright Management Information (CPR_MAI), except that ECC block 100 uses 2 bytes rather than the conventional 6 bytes. The second through tenth rows, e.g., rows 1–9, of each sector include 172 bytes of user data. The eleventh row of each sector, e.g., row 10, includes 168 bytes of data and a 4 byte field for the Error Detection Code (EDC). Rows 22–86 in FIG. 3 are the third through seventh sectors plus the first 10 rows of the eighth sector. As described above, each row also includes 10 parity bytes.

Each sector includes two rows of Outer Parity code of 172 bytes. For example, the Outer Parity code in rows 88 and 89 are associated with the first sector and the Outer Parity code in rows 102 and 103 are associated with the eighth sector. In one embodiment, the Outer Parity bytes are interleaved, e.g., with their respective sectors. For example, the last two rows of each sector are the two rows of associated Outer Parity bytes, e.g., Outer Parity bytes for the first sector (shown in FIG. 3 as rows 88 and 89) may be located at rows 12 and 13. Thus, ECC block 100 has 8 sectors, each of which includes a total of 13 rows, 11 rows of data and 2 rows of outer parity.

In addition, the columns are interleaved by 182 bytes. Each row of data is read from left to right before the next row of data is read. Thus, each byte in a column is separated by 182 bytes from the next byte in the same column.

Figures 4, 5:
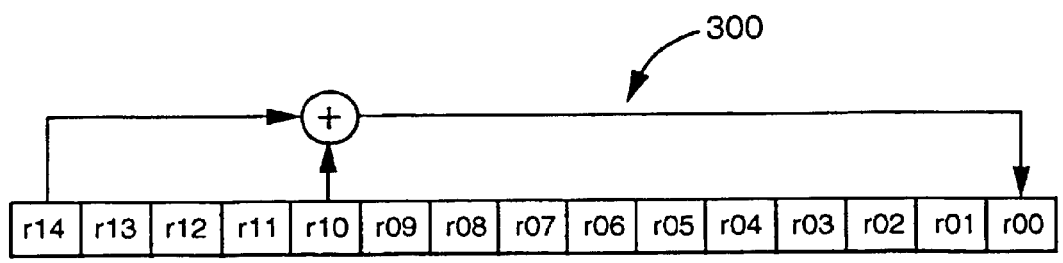
FIG. 4 shows one data frame, e.g., sector, within an ECC block.
FIG. 5 is a block diagram of a scrambling circuit that is used to scramble the user data within each data frame.

To form ECC block 100, a data frame 200, such as that shown in FIG. 4, is formed. Data frame 200 has eleven rows of 172 bytes each, and includes a 4 byte field for sector Identification Data (ID), a 2 byte field for an ID Error Detection Code (IED), a 2 byte field for System Information (SI), and 1880 bytes of user data and a four byte field for the Error Detection Code (EDC). The ID, IED, and SI are described in more detail in ECMA Standard 279, pages 26–27, which is incorporated herein by reference, where SI is similar to the Copyright Management Information (CPR_MAI), except that ECC block 100 uses 2 bytes rather than the conventional 6 bytes. The ECC block 100 includes eight scrambled data frames, along with associated outer parity bytes and inner parity bytes.

The error detection code (EDC) must reflect the number of bytes preceding it. The data frame 200 has 1888 bytes of data preceding the EDC. Considering the data frame, including the ID, IED, SI, User Data, and EDC fields, as a single bit field starting with the most significant bit (msb) of the first byte of the ID field and ending with the least significant bit (lsb) of the EDC field (where each byte is 8 bits), then the msb will be $b_{15,135}$ and the lsb will be $b_0$. Each bit $b_i$ of the 4 byte EDC field is then as follows for i=31 to 0:

$$EDC(x) = \sum_{i=31}^{0} b_i x^i = I(x) \bmod G(x) \qquad \text{eq. 1}$$

where $$I(x) = \sum_{i=15,135}^{32} b_i x^i; \text{ and} \qquad \text{eq. 2}$$

$$G(x) = x^{32} + x^{31} + x^4 + 1. \qquad \text{eq. 3}$$

The 1880 user data bytes in the data field 200 are scrambled by means of scrambling circuit 300 shown in FIG. 5. Scrambling circuit 300 includes a feedback bit shift register in which bits $r_{07}$(msb) to $r_{00}$(lsb) represent a scrambling byte at each 8-bit shift. At the beginning of the scrambling procedure of an ECC Block, positions $r_{14}$ to $r_{00}$ are pre-set to the value(s) specified in Table 1.

TABLE 1

| Initial Preset Number | Initial Value |
|---|---|
| 0 h | 0001 h |
| 1 h | 5500 h |
| 2 h | 0002 h |
| 3 h | 2A00 h |
| 4 h | 0004 h |
| 5 h | 5400 h |
| 6 h | 0008 h |
| 7 h | 2800 h |

The scrambling procedure begins with preset number 0 at the beginning of ECC Block 100. The first data frame, e.g., the first sector, of the ECC Block 100 uses Preset Number 0, the second data frame, e.g., the second sector, uses Preset Number 1 and so on until the eighth and last data frame, e.g., the eighth sector, of the ECC Block 100, which uses Preset Number 7. For every new ECC Block, the sequence is repeated starting with Preset Number 0 again.

The part of the initial value of $r_{07}$ to $r_{00}$ is taken out as scrambling byte $S_0$. After that, 8-bit shift is repeated 1879 times and the following 1879 bytes are taken from $r_{07}$ to $r_{00}$ as scrambling bytes $S_1$ to $S_{1879}$. The user data bytes $D_k$ of the data frame become scrambled bytes $D'_k$ where:

$$D'_k = D_k \oplus S_k \qquad \text{eq. 4}$$

where k=0 to 1879, and $\oplus$ stands for Exclusive OR.

Figure 6:
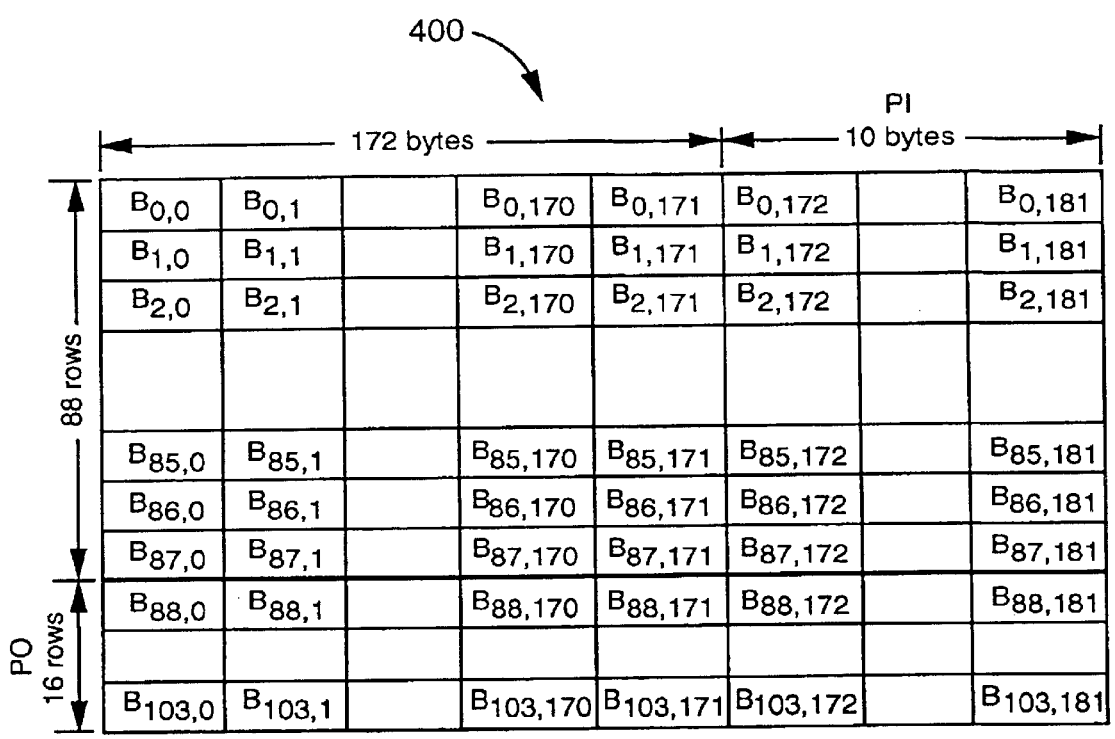
FIG. 6 shows the array of bytes in an ECC block in accordance with the present invention, which is an arrangement of eight consecutive scrambled data frames with Reed-Solomon parity appended.

The ECC block 100 is formed by arranging eight consecutive scrambled data frames, in an array of 88 rows of 172 bytes each. FIG. 6 shows an array 400 of bytes in an ECC block in accordance with the present invention, which is an arrangement of eight consecutive scrambled data frames with Reed-Solomon parity appended. To each of the 172 columns, 16 bytes of Parity of Outer Code (PO) are added, then, to each of the resulting 104 rows, 10 bytes of Parity of Inner Code (PI) are added. Thus, array 400 (which is the same as ECC block 100 shown in FIG. 3) comprises 104 rows of 182 bytes each. The bytes of the array 400 are identified as $B_{i,j}$ as follows, where i is the row number and j is the column number $B_{i,j}$ for i=0 to 87 and j=0 to 171 are bytes from the scrambled data frame;

$B_{i,j}$ for i=88 to 103 and j=0 to 171 are bytes from the Outer Parity code;

$B_{i,j}$ for i=0 to 103 and j=172 to 181 are bytes form the Inner Parity code.

The Outer Parity and Inner Parity codes are obtained as follows. In each of the columns j=0 to 171, the 16 Outer Parity (PO) bytes are defined by the remainder polynomial $R_j(x)$ to form the outer code RS(104,88,17).

$$R_j(x) = \sum_{i=88}^{103} B_{i,j} x^{103-i} = I_j(x) x^{16} \bmod G_{PO}(x); \quad \text{eq. 5}$$

where $$I_j(x) = \sum_{i=0}^{87} B_{i,j} x^{87-i}; \text{ and} \quad \text{eq. 6}$$

$$G_{PO}(x) = \prod_{k=o}^{15} (x + \alpha^k) \quad \text{eq. 7}$$

where the term α is the primitive root of the primitive polynomial $$P(x) = x^8 + x^4 + x^3 + x^2 + 1. \quad \text{eq. 8}$$

In each of the rows i=0 to 103, the 10 Inner Parity (PI) bytes are defined by the remainder polynomial $R_j(x)$ to form the inner code RS(182,172,11).

$$R_i(x) = \sum_{j=172}^{181} B_{i,j} x^{181-j} = I_i(x) x^{10} \bmod G_{PI}(x); \quad \text{eq. 9}$$

where $$I_i(x) = \sum_{j=0}^{171} B_{i,j} x^{171-j}; \text{ and} \quad \text{eq. 10}$$

$$G_{PI}(x) = \prod_{k=o}^{9} (x + \alpha^k). \quad \text{eq. 11}$$

Eight Recording Frames are obtained by interleaving two of the 16 Outer Parity Code rows at a time after every 11 rows of an ECC Block. FIG. 7 shows the data block recording frames 500. Thus, the 18928 bytes of an ECC Block are re-arranged into 8 Recording Frames of 2,366 bytes. Each Recording Frame consists of an array of 13 rows of 182 bytes as shown in FIG. 7.

Thus, ECC block 100 (shown in FIG. 3), in accordance with the present invention, has only 88 bytes in a column with 16 bytes of parity and is divided into 8 sector, each having 13 rows. Accordingly, ECC block 100 has half the number of rows of a conventional ECC block, which has 16 sectors. The small size of ECC block 100 permits ECC block 100 to be used advantageously with small form factor optical disks.

Moreover, ECC block 100 has 16 bytes of redundancy for 88 bytes of data per column, while the conventional ECC block has 16 bytes of redundancy for 196 bytes of data per column. Accordingly, ECC block 100, in accordance with the present invention, has a higher percentage of redundancy and is, thus, capable of correcting a larger amount of errors relative to a conventional ECC block. For the sake of comparison, the ratio of parity bytes to data bytes in ECC block 100 is approximately twice the ratio for a conventional ECC block. The large ratio of parity bytes to data bytes is particularly advantageous with first-surface media, which is more sensitive to small sized particles than conventional systems and, thus, needs increased correction capability.

Figure 8:
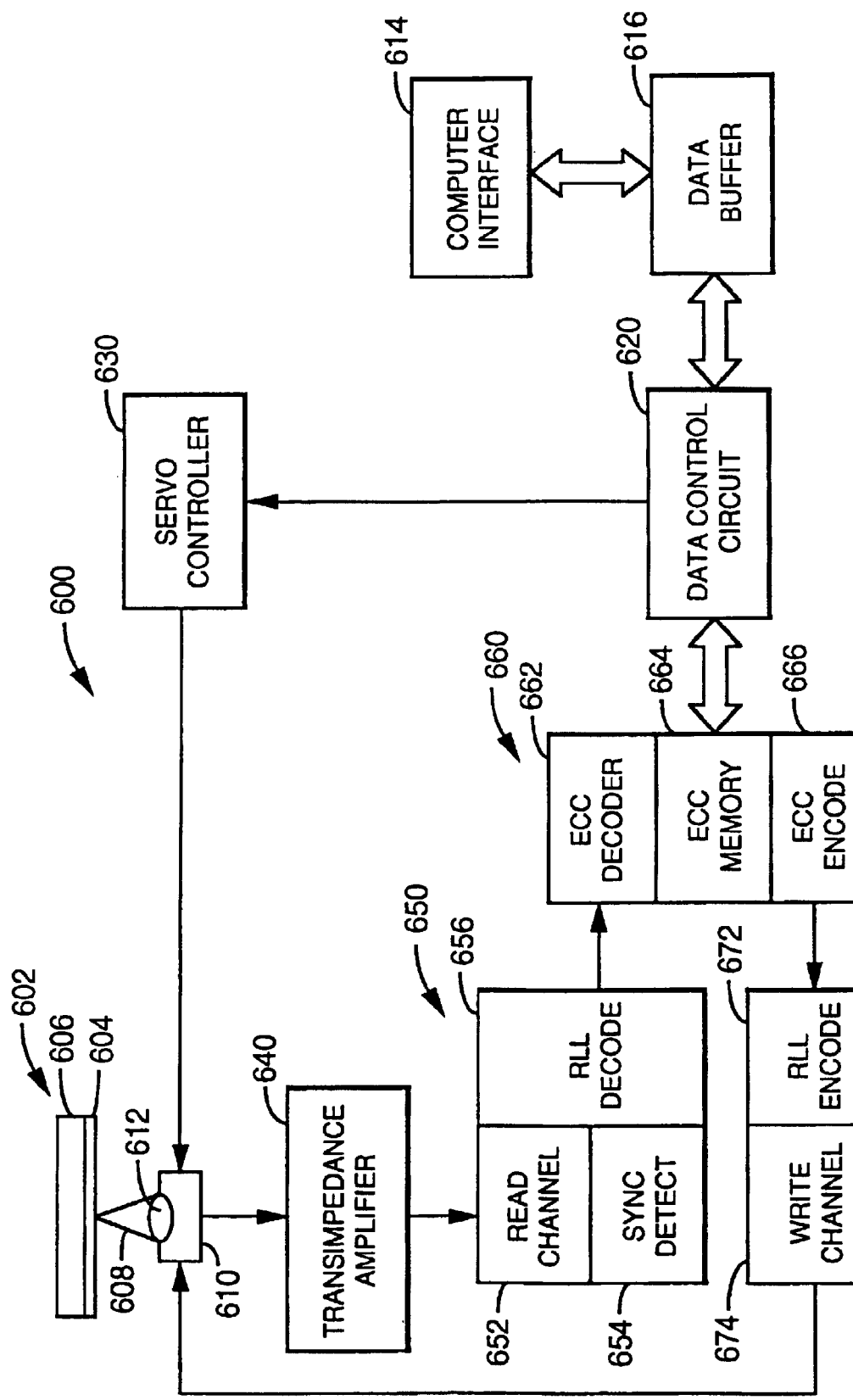
FIG. 8 is a block diagram of a DVD type system that may be used to read or write information including an ECC block.

FIG. 8 shows a block diagram of a DVD type system 600 that may be used to read or write information that includes an ECC block 100 in accordance with the present invention on an optical medium 602. Except for modifications to the error correction code encode and decode and the scrambling circuit, e.g., within data control circuit 620 to implement the ECC block 100 format, system 600 may operate in a conventional manner.

Optical medium 602 is a first-surface media that includes a recording layer 604 on a substrate 606, where the recording layer 604 is on the exterior of the optical medium 602 such that a read/write beam 608 from optical head 610 does not pass through any portion of the optical medium 602 prior to reaching the recording layer 604. In some embodiments of optical medium 602, a thin protective layer, e.g., 2.5 μm thick, is present over recording layer 604.

An external apparatus, such as a host computer, communicates with system 600 through interface 614 and data buffer 616. The external apparatus may provide only a file name, and the data control circuit 620 or other appropriate circuit determines the correct address, and controls the servo controller 630 to position the optical head 610 appropriately. The scrambling circuit to scramble and unscramble the data in each frame, as described above in reference to FIG. 5, Table 1, and equation 4 may be implemented in data control circuit 620, which is well within the knowledge of those skilled in the art.

In another embodiment, the external apparatus may provide to a data control circuit 620 a sector address from which information is to be read or written. The data control circuit 620 calculates a block address and a sector address in the block. The calculated block address is then sent to servo controller 630 to position the optical head 610.

The optical head 610 produces a read/write beam 608 through objective lens 612 that focuses the read/write beam 608 on the recording layer 604. An optical head may be used, such as that described in U.S. patent application, entitled, "Low Profile Optical Head", by Ian Redmond et al., U.S. Ser. No. 09/457,104, filed Dec. 7, 1999, and U.S. patent application, entitled, "Beamshaper For Optical Head", by Ian Redmond et al., U.S. Ser. No. 09/764,026, filed Jan. 16, 2001, which have the same assignee as the present disclosure and are incorporated herein by reference. For a read operation, the read/write beam 608 is at a level that will not erase recorded information on the recording layer 604. During a read operation, the signal from optical head 610 is received by transimpedance amplifier 640. The amplified signal from amplifier 640 is received by a read circuit 650, which includes the read channel 652, a synchronization detect circuit 654, and RLL decode circuit 656. The synchronization detect circuit 654 extracts a clock signal and a synchronizing signal from the digital signal received by the read channel 652. The read circuit 650 reads the digital signal from the amplifier 640 as a channel code and demodulates the channel code to a data word with reference to the clock signal and the synchronizing signal. The read circuit 650 provides the formatted data to the ECC circuit 660, which includes ECC decoder circuit 662 and ECC memory 664. ECC decoder circuit 662 corrects any errors in the formatted data and stores the corrected data in memory 664. Data control circuit 620 receives the corrected data from memory 664.

During a write operation, the data control circuit 620 provides the scrambled data frames to be written to ECC memory 664. The ECC encode circuit 666 produces the ECC block, provides the ECC block to the write circuit 670, including RLL encode circuit 672 and write channel 674. The write channel provides a signal to optical head 610, which writes the data on the optical medium 602.

It should be understood that the present invention may be used with any conventional system, which are well known in the art, with modifications to the ECC encode/decode circuits and the scrambling circuit. Thus, the operation of system 600 is similar to conventional DVD type systems, except that the ECC decoder circuit 662 and ECC encode circuit 666 must be modified for the ECC block 100 as described in reference to equations 8 to 11 as well as encode and decode the outer and inner parity as described in reference to equations 1 to 7. The implementation of the ECC block 100 in ECC decoder circuit 662 and ECC encode circuit 666 is well within the skill of those in the art.

Although the present invention is illustrated in connection with specific embodiments for instructional purposes, the present invention is not limited thereto. Various adaptations and modifications may be made without departing from the scope of the invention. The broad principles of this invention are applicable to any type of data storage disk, whether the disk be optical, magnetic-optical or magnetic, regardless whether the data is stored on one or both sides of the disk, and regardless of whether the disk has both writable and mastered areas or only writeable areas. Therefore, the spirit and scope of the appended claims should not be limited to the foregoing description.

What is claimed is:

1. A first-surface optical disk for use with a laser beam, comprising:

an information layer, and a transparent layer overlaying tie information layer, wherein the thickness of the transparent layer with respect to the wavelength of the read/write laser beam is such that dust particles on the surface of the transparent layer are not defocused when reading data from the information layer with the laser beam passing through the transparent layer, and wherein the information layer is organized into ECC blocks, each ECC block forming an array of 104 rows and 182 columns of bytes, each row including ten bytes of inner parity and each column including sixteen bytes of outer parity.

2. The first-surface optical disk of claim 1, wherein said array includes row codewords being RS(182,172,11) and column codewords being RS(104,88,17).

3. The first-surface optical disk of claim 1, wherein said array is divided into eight sectors, each sector having thirteen rows.

4. The first-surface optical disk of claim 3, wherein each sector comprises eleven rows of data and two rows of outer parity, each row having ten bytes of inner parity.

5. The first-surface optical disk of claim 3, wherein each sector comprises:

a four byte identification data (ID) field;

a two byte ID error detection code field;

a two byte system information field;

a 1880 byte user data field; and a four byte error detection cede field.

* * * * *